(12) United States Patent
Xia et al.

(10) Patent No.: US 8,929,017 B2
(45) Date of Patent: Jan. 6, 2015

(54) SYSTEMS AND METHODS FOR SNR MEASUREMENT USING EQUALIZED DATA

(75) Inventors: Haitao Xia, San Jose, CA (US); Ming Jin, Fremont, CA (US); Dahua Qin, Allentown, PA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 152 days.

(21) Appl. No.: 13/316,953

(22) Filed: Dec. 12, 2011

(65) Prior Publication Data

US 2013/0148233 A1 Jun. 13, 2013

(51) Int. Cl.
*G11B 5/035* (2006.01)
*G11B 5/596* (2006.01)
*G11B 20/10* (2006.01)

(52) U.S. Cl.
CPC ........ *G11B 5/59605* (2013.01); *G11B 5/59622* (2013.01); *G11B 20/10046* (2013.01); *G11B 5/035* (2013.01)
USPC .................. 360/65; 360/39; 360/55; 375/229

(58) Field of Classification Search
CPC .... G11B 20/10046; G11B 5/02; G11B 5/035; G11B 20/24; G11B 23/0007; G11B 5/59622; G11B 5/59605
USPC .......................... 360/65, 55, 246, 39; 375/229
See application file for complete search history.

(56) References Cited

U.S. PATENT DOCUMENTS

| | | | |
|---|---|---|---|
| 5,961,658 A * | 10/1999 | Reed et al. | 714/746 |
| 6,208,481 B1 * | 3/2001 | Spurbeck et al. | 360/65 |
| 7,113,356 B1 | 9/2006 | Wu | |
| 8,094,535 B2 * | 1/2012 | Minemura | 369/59.22 |
| 2003/0151842 A1 * | 8/2003 | Takiguchi | 360/65 |
| 2004/0169945 A1 * | 9/2004 | Hiura et al. | 360/39 |
| 2004/0172148 A1 * | 9/2004 | Horibe | 700/94 |
| 2005/0265199 A1 * | 12/2005 | Nakano et al. | 369/59.22 |
| 2005/0270939 A1 * | 12/2005 | Kashihara et al. | 369/47.53 |
| 2006/0256670 A1 | 11/2006 | Park | |
| 2007/0047127 A1 * | 3/2007 | Hutchins et al. | 360/65 |
| 2008/0144708 A1 * | 6/2008 | Tsuie et al. | 375/227 |
| 2011/0164669 A1 | 7/2011 | Mathew | |

OTHER PUBLICATIONS

U.S. Appl. No. 13/251,342, Unpublished, filed Oct. 3, 2011, Haitao Xia.

* cited by examiner

*Primary Examiner* — Thomas Alunkal
(74) *Attorney, Agent, or Firm* — Hamilton DeSanctis & Cha (57) ABSTRACT

Various embodiments of the present invention provide systems and methods for data processing. For example, a data processing system is discussed that includes: an equalizer circuit, a signal to noise ratio calculation circuit, and a parameter adjustment circuit. The equalizer circuit is operable to equalize a data input to yield an equalized output. The signal to noise ratio calculation circuit is operable to calculate a signal to noise ratio of the equalized output based at least in part on a noise power derived from the equalized output. The parameter adjustment circuit is operable to adjust a parameter based at least in part on the signal to noise ratio.

20 Claims, 4 Drawing Sheets

SYSTEMS AND METHODS FOR SNR MEASUREMENT USING EQUALIZED DATA

BACKGROUND OF THE INVENTION

The present inventions are related to systems and methods for enhancing data processing, and more particularly to systems and methods for determining signal to a noise ratio in a data processing system.

Various data processing circuits have been developed that include an analog to digital converter circuit providing a number of digital samples representing an analog data input. The digital samples equalized to yield an equalized output, and the equalized output is further processed by data detector and/or data decoder circuitry using a programmed target. In theory, a better programmed target should yield better performance by downstream data processing circuitry. However, knowledge of the quality of the programmed target is often impossible to discern, and is therefore difficult to improve.

Hence, for at least the aforementioned reasons, there exists a need in the art for advanced systems and methods for data processing.

BRIEF SUMMARY OF THE INVENTION

The present inventions are related to systems and methods for enhancing data processing, and more particularly to systems and methods for determining signal to a noise ratio in a data processing system.

Various embodiments of the present invention provide data processing systems. The data processing systems include an equalizer circuit, a signal to noise ratio calculation circuit, and a parameter adjustment circuit. The equalizer circuit is operable to equalize a data input to yield an equalized output. The signal to noise ratio calculation circuit is operable to calculate a signal to noise ratio of the equalized output based at least in part on a noise power derived from the equalized output. The parameter adjustment circuit is operable to adjust a parameter based at least in part on the signal to noise ratio. In some cases, the system is implemented as part of a storage device or a receiving device. In various cases, the data processing system is implemented as part of an integrated circuit.

In some instances of the aforementioned embodiments, the data processing system further includes a noise predictive filter circuit operable to filter the equalized output to yield a filtered output. In such instances, operation of the noise predictive filter circuit is governed at least in part by the parameter. In various cases, the parameter is a first parameter, and the parameter adjustment circuit is further operable to adjust a second parameter based at least in part on the signal to noise ratio. In such cases, the data processing system further includes a data detection circuit operable to apply a data detection algorithm to the filtered output where operation of the data detection circuit is governed at least in part by the second parameter. In one or more instances of the aforementioned embodiments, the data processing system further includes a data detection circuit operable to apply a data detection algorithm to a signal derived from the equalized output to yield a detected output where operation of the noise predictive filter circuit is governed at least in part by the parameter. The aforementioned data detection algorithm may be, but is not limited to, a Viterbi data detection algorithm, or a maximum a posteriori data detection algorithm.

In some instances of the aforementioned embodiments, the signal to noise ratio calculation circuit is operable to calculate a series of error values as a difference between corresponding instances of an ideal output and the equalized output. The noise power is a sum of the square of each of the series of error values. In some cases, the ideal output is calculated from a known data input by summing a series of products of target values and instances of the known data input. In other cases, the data processing system further includes a data detection circuit operable to apply a data detection algorithm to a signal derived from the equalized output to yield a detected output where wherein operation of the noise predictive filter circuit is governed at least in part by the parameter. In such cases, the ideal output may be calculated from the detected output by summing a series of products of target values and instances of the detected output. In various instances, a signal power is calculated based upon a signal output that may be the equalized output, or the ideal output. In such instances, the signal power may be calculated by summing a square of each of a series of instances of the signal output, and the signal to noise ratio is calculated as a ratio of the signal power to the noise power.

Other embodiments of the present invention provide methods for data processing. The methods include: equalizing a data input to yield an equalized output; calculating a signal to noise ratio of the equalized output based at least in part on a noise power derived from the equalized output; and adjusting a parameter of a data processing system based at least in part on the signal to noise ratio. In some instances of the aforementioned embodiments a noise predictive filter circuit operable to filter the equalized output to yield a filtered output. In such instances, the noise predictive filter circuit is governed at least in part by the parameter. In Various cases, the parameter is a first parameter. In such instances, the data processing system further includes a data detection circuit operable to apply a data detection algorithm to the filtered output. In such instances, the data detection circuit is governed at least in part by the second parameter, and the method further includes adjusting the parameter of the data processing system based at least in part on the signal to noise ratio.

In various instances of the aforementioned embodiments, calculating the signal to noise ratio of the equalized output based at least in part on a noise power derived from the equalized output includes: calculating a series of error values as a difference between corresponding instances of an ideal output and the equalized output where the noise power is a sum of the square of each of the series of error values; calculating a signal power based upon a signal output; and calculating a ratio of the signal power to the noise power to yield the signal to noise ratio. The signal output may be the equalized output, or the ideal output. Calculating the signal power is done by summing a square of each of a series of instances of the signal output In some cases, the methods further include applying a data detection algorithm to an equalized data set derived from the equalized output to yield a detected output. The ideal output is calculated based upon either a known data set or the detected output. In some cases, the ideal output is calculated by summing a series of products of target values and instances of the source data set.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for enhancing data processing, and more particularly to systems and methods for determining signal to a noise ratio in a data processing system.

Various embodiments of the present invention provide data processing circuits that include an analog to digital converter circuit that provides a series of digital samples to an equalizer circuit. The equalizer circuit in turn provides an equalized output. The equalized output is provided to a data detector circuit that applies a data detection algorithm to the equalized output to yield a detected output. A data decode algorithm is applied by a data decoder circuit to yield a decoded output. A signal to noise ratio of the equalized output is calculated by a signal to noise ratio computation circuit to determine whether a programmed target used by the data detector circuit is operating within a desired range. Where the signal to noise ratio is to low, the programmed target may be adjusted and the signal to noise ratio recalculated. This process may continue until an acceptable signal to noise ratio is found, and at that point the programmed target is maintained constant. The same signal to noise ratio information may also be used to program other parameters in the data processing circuit such as, for example, a gain feedback loop and/or a magnetoresistive head asymmetry (MRA) correction loop.

Figure 1:
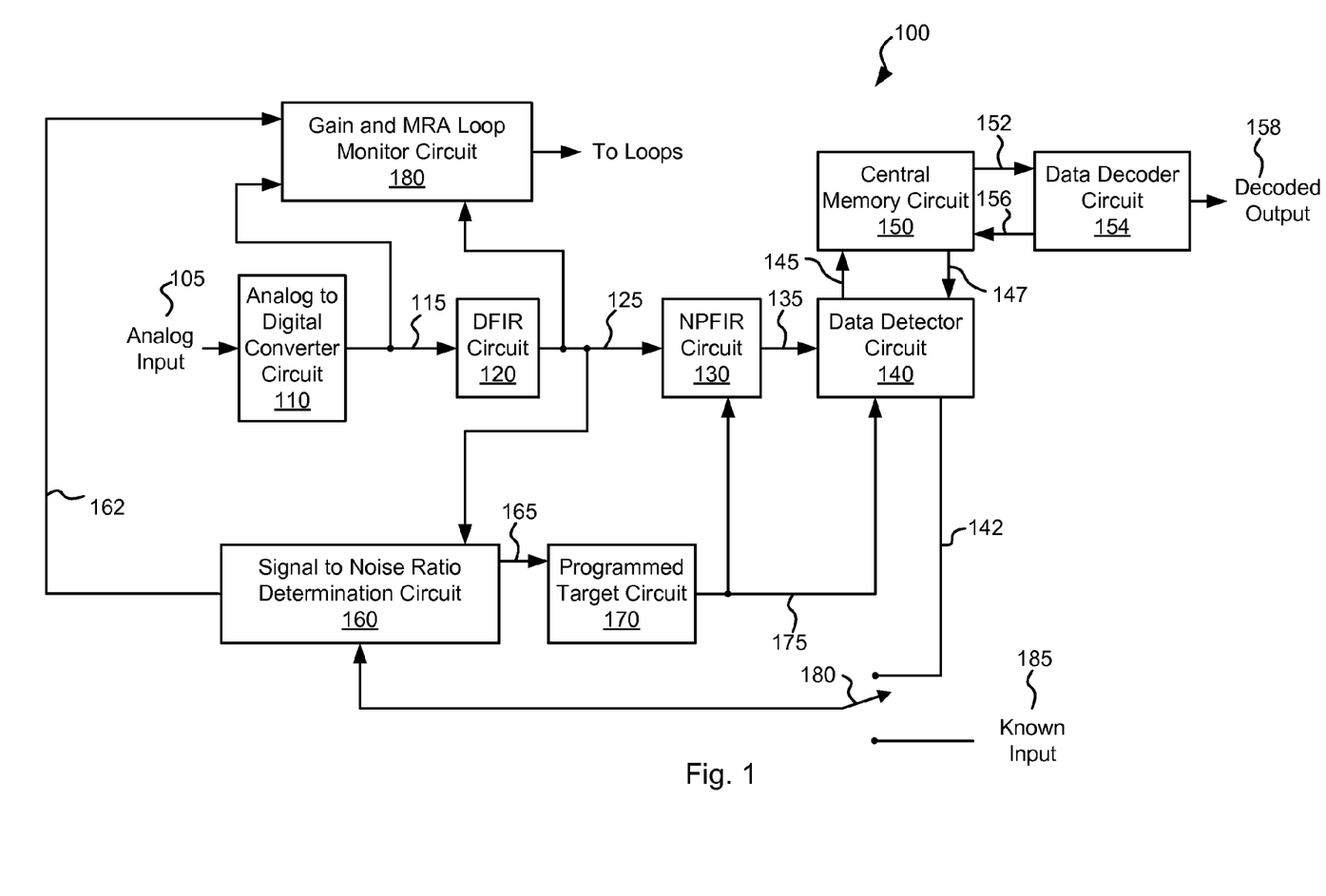
FIG. 1 depicts a data processing circuit including a signal to noise ratio determination circuit in accordance with some embodiments of the present invention.

Turning to FIG. 1, a data processing circuit 100 is shown that includes a signal to noise ratio determination circuit 160 in accordance with some embodiments of the present invention. Data processing circuit 100 includes an analog to digital converter circuit 110 that converts an analog input signal 105 into a series of digital samples 115 that are provided to an equalizer circuit 120. Equalizer circuit 120 may be any circuit known in the art that is capable of equalizing a data input. In some cases, equalizer circuit 120 is implemented as a digital finite impulse response (DFIR) filter as are known in the art. Equalizer circuit 120 filters the received input and provides a corresponding equalized output 125 to a noise predictive filter circuit 130, a gain and MRA loop monitor circuit 180, and signal to noise ratio determination circuit 160.

Gain and MRA loop monitor circuit 180 uses a signal to noise ratio output 162 determined by signal to noise ratio determination circuit 160 to select an appropriate gain and MRA parameters for data processing circuit 100. In some cases, gain and MRA loop monitor circuit 180 incrementally adjusts a gain parameter and/or an MRA loop parameter until signal to noise ratio output 162 is greater than a threshold. In some cases, the threshold is programmable. In other cases, gain and MRA loop monitor circuit 180 incrementally adjusts the gain parameter and/or the MRA loop parameter over a range of potential gain parameter and/or MRA loop parameters until a maximum value of signal to noise ratio output 162 is achieved. Once the maximum value is identified, gain and MRA loop monitor circuit 180 applies the gain parameter and/or MRA loop parameters corresponding to the identified maximum value of signal to noise ratio output 162.

Noise predictive filter circuit 130 may be any circuit known in the art capable of providing noise predictive filtering. In some cases, noise predictive filter circuit 130 is a set of digital finite impulse response filters each tuned to a different noise predictive target. The target utilized by noise predictive filter circuit 130 is provided as a current target parameter set 175 from a programmed target circuit 170 that is discussed below in more detail.

Noise predictive filter circuit 130 provides a noise filtered output 135 to a data detector circuit 140. Data detector circuit 140 applies a data detection algorithm to noise filtered output 135 to yield a detected output 145. In some embodiments of the present invention, the data detection algorithm is a maximum a posteriori data detection algorithm as are known in the art. In other embodiments of the present invention, the data detection algorithm may be a Viterbi data detection algorithm as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. The coefficients utilized by data detector circuit 140 are provided as part of current target parameter set 175 from programmed target circuit 170 that is discussed below in more detail.

The coefficients and targets used for both noise predictive filter circuit 130 and data detector circuit 140 may be selected and/or tuned based upon a signal to noise ratio output 165 determined by signal to noise ratio determination circuit 160, and may be updated by a programmed target circuit 170. Programmed target circuit 170 provides current target parameter set 175. In one particular embodiment of the present invention, programmed target circuit 170 incrementally adjusts one or more of the values provided as current target parameter set 175 until signal to noise ratio output 165 is greater than a threshold. In some cases, the threshold is programmable. In other cases, programmed target circuit 170 incrementally adjusts one or more of the values provided as current target parameter set 175 over a range of potential values until a maximum value of signal to noise ratio output 165 is achieved. Once the maximum value is identified, programmed target circuit 170 applies the values provided as current target parameter set 175 corresponding to the identified maximum value of signal to noise ratio output 165.

Detected output 145 is provided to a central memory circuit 150 where it is maintained until a data decoder circuit 140 is available. When available, data decoder circuit 154 retrieves the detected output 145 as a decoder input 152 from central memory circuit 150, and applies a data decode algorithm to detected output 145 to yield a decoded output 158. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Where decoded output 158 converges (i.e., corresponds to the originally written data set), it is provided as an output. Otherwise, where decoded output 158 fails to converge and a timeout condition has not yet been met, data decoder circuit 154 provides an interim decode result 156 to central memory circuit 150 where it is maintained until data detector circuit 140 is ready to process the result again. When it is available, data detector circuit 140 accesses interim decode result 156 as a detector input 147 from central memory circuit 150 and applies the data detection algorithm again to noise filtered output 135 guided by interim decode result 156.

Signal to noise ratio determination circuit 160 computes a signal to noise ratio of equalized output 125 using a processing input 182. Processing input 182 may be either a known input 185 or a hard decision output 142 depending upon a selector circuit 180. Selector circuit 180 may be user programmable to select between known input 185 and hard decision output 142 to drive processing input 182. Known output 185 may be derived from a storage device that stores the decoded version of the currently processing data introduced to data processing circuit 100. Hard decision output 142 is a reasonable approximation of a decoded version of the currently processing data introduced to data processing circuit 100.

In one particular embodiment of the present invention, signal to noise ratio determination circuit 160 calculates an ideal output ($y_{ideal}$) consistent with the following equation:

$$y_{ideal}(k) = \sum_{j=0}^{D-1} T_j b_{k-j},$$

where k indicates a particular instance, b (i.e., $b_1$, $b_2$, $b_3$ . . . ) is received as processing input 182, and T (i.e., $T_0$, $T_1$, $T_2$ . . . ) are target taps provided to signal to noise ratio determination circuit 160. In some embodiments the target taps are programmable. The value of D corresponds to the number of target taps. In one particular embodiment of the present invention, a three tap filter is used (i.e., $T_0$, $T_1$, $T_2$ and D=3).

Using the above mentioned ideal output, signal to noise ratio determination circuit 160 calculates an error value that is the difference between the ideal output and the corresponding instance of equalized output 125. The error value may be calculated consistent with the following equation:

$$error(k) = y(k) - y_{ideal}(k),$$

where y(k) is the corresponding instance of equalized output 125. Signal to noise ratio determination circuit 160 calculates a signal power of the ideal output, a signal power of equalized output 125, and a noise power consistent with the following equations:

$$\text{Signal } Power_{actual} = \sum_{k=1}^{N} [y(k)]^2;$$

$$\text{Signal } Power_{ideal} = \sum_{k=1}^{N} [y_{ideal}(k)]^2; \text{ and}$$

$$\text{Noise Power} = \sum_{k=1}^{N} [error(k)]^2$$

where N is a number of instances (k) over which the power calculation is averaged. In some embodiments of the present invention, N is four thousand. Based upon the disclosure provided herein, one of ordinary skill in the art will recognize a number of values of N that may be used in relation to different embodiments of the present invention. Signal to noise ratio determination circuit 160 uses one of the signal powers along with the noise power to calculate an effective signal ratio. The effective signal ratio may be calculated consistent with the following equation:

$$\text{Effective Signal Ratio} = 10\log_{10}\left(\frac{\text{Signal } Power_{ideal}}{\text{Noise Power}}\right),$$

or $$\text{Effective Signal Ratio} = 10\log_{10}\left(\frac{\text{Signal } Power_{actual}}{\text{Noise Power}}\right).$$

The above mentioned effective signal ratio is provided as signal to noise ratio output 165 and signal to noise ratio output 162.

Figure 2A:
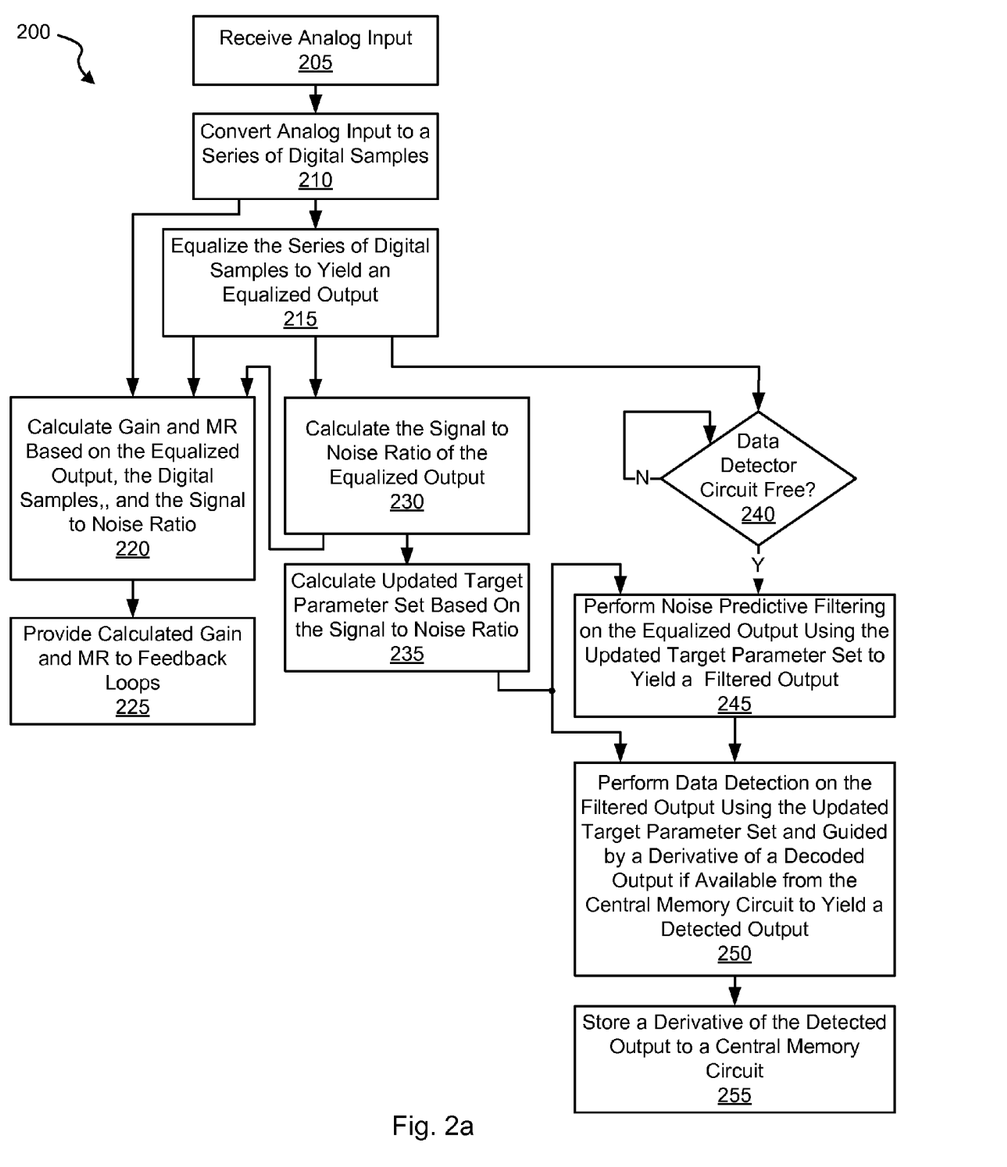
FIGS. 2a-2b are flow diagrams showing a method in accordance with various embodiments of the present invention for signal to noise ratio determination in relation to data processing.

Turning to FIG. 2a, a flow diagram 200 shows a method for performing data processing including a data detection process that relies on a signal to noise ratio calculation to tune one or more parameters of a data processing circuit. Following flow diagram 200, an analog input is received (block 205). The analog input may be derived from, for example, a storage medium or a data transmission channel. Based upon the disclosure provided herein, one of ordinary skill in the art will recognize a variety of sources of the analog input. The analog input is converted to a series of digital samples (block 210). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 215). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

A signal to noise ratio of the equalized output is calculated (block 230). This signal to noise ratio is calculated based upon either a known value corresponding to the equalized output or hard decision values corresponding to the equalized output. Such a known value is a decoded version of the currently processing data introduced a data processing device as the aforementioned analog input. Where a known value is used, the known value may be accessed from a memory where it was pre-stored before operation began. Alternatively, where a hard decision value is used, hard decision values derived from a detected output (e.g., hard decision values from the process of block 250) may be used. The hard decision value is thus a decoded version of the currently processing data introduced a data processing device as the aforementioned analog input. Calculating the signal to noise ratio includes calculating an ideal output ($y_{ideal}$) consistent with the following equation:

$$y_{ideal}(k) = \sum_{j=0}^{D-1} T_j b_{k-j},$$

where k indicates a particular instance, b (i.e., $b_1, b_2, b_3 \ldots$) is received as processing input 182, and T (i.e., $T_0, T_1, T_2 \ldots$) are target taps provided to signal to noise ratio determination circuit 160. In some embodiments the target taps are programmable. The value of D corresponds to the number of target taps. In one particular embodiment of the present invention, a three tap filter is used (i.e., $T_0, T_1, T_2$ and D=3).

Using the above mentioned ideal output, an error value is calculated that is the difference between the ideal output and the corresponding instance of the equalized output. The error value may be calculated consistent with the following equation:

$$error(k) = y(k) - y_{ideal}(k),$$

where y(k) is the corresponding instance of the equalized output. Signal powers are then calculated. In some embodiments of the present invention, the signal power of the ideal output is used, while in other cases the signal power of the equalized output is used. The signal power and noise power may be calculated consistent with the following equations:

$$\text{Signal Power}_{actual} = \sum_{k=1}^{N} [y(k)]^2;$$

$$\text{Signal Power}_{ideal} = \sum_{k=1}^{N} [y_{ideal}(k)]^2; \text{ and}$$

$$\text{Noise Power} = \sum_{k=1}^{N} [error(k)]^2$$

where N is a number of instances (k) over which the power calculation is averaged. In some embodiments of the present invention, N is four thousand. Based upon the disclosure provided herein, one of ordinary skill in the art will recognize a number of values of N that may be used in relation to different embodiments of the present invention. The signal power that was calculated (i.e., either the signal power based on the equalized output or the signal power based on the ideal output) is used along with the noise power to calculate an effective signal ratio. The effective signal ratio may be calculated consistent with the following equation:

$$\text{Effective Signal Ratio} = 10\log_{10}\left(\frac{\text{Signal Power}_{ideal}}{\text{Noise Power}}\right),$$

or $$\text{Effective Signal Ratio} = 10\log_{10}\left(\frac{\text{Signal Power}_{actual}}{\text{Noise Power}}\right).$$

The above mentioned effective signal ratio is provided as a signal to noise ratio output.

An updated target parameter set is calculated based upon the signal to noise ratio output (block 235). The updated target parameter set includes coefficients and targets used in both a noise predictive filtering process (block 245) and a data detection process (block 250). The process of updating the target parameter set (block 235) includes incrementally adjusting one or more of the values provided as the updated target parameter set until the signal to noise ratio output is greater than a threshold. In some cases, the threshold is programmable. In other cases, the process of updating the target parameter set (block 235) includes incrementally adjusting one or more of the values provided as the updated target parameter set over a range of potential values until a maximum value of the signal to noise ratio output is achieved. Once the maximum value is identified, the updated target parameter set is maintained and the process of updating is terminated.

In addition, an updated MR value and gain value are calculated based upon the digital samples, the equalized output, and the signal to noise ratio output (block 220). The updated MR value is used to compensate for magnetoresistive head asymmetry, and the gain value is used to adjust to obtain a desired input gain. The process of updating the MR value and the gain value (block 220) includes incrementally adjusting one or more of the values incorporated in the MR and gain calculations until the signal to noise ratio output is greater than a threshold. In some cases, the threshold is programmable. In other cases, the process of updating the MR value and the gain value (block 220) includes incrementally adjusting one or more of the values incorporated in the MR and gain calculations over a range of potential values until a maximum value of the signal to noise ratio output is achieved. Once the maximum value is identified, the updated MR value and gain value are maintained and the process of updating is terminated. The updated gain value and MR value are provided to respective gain and MR feedback loops (block 225). Based on the disclosure provided herein, one of ordinary skill in the art will recognize a variety of MR and gain loops, and corresponding MR value and gain values that may be used in relation to different embodiments of the present invention.

It is determined whether a data detector circuit is available (block 240). Where a data detector circuit is available (block 240), noise predictive filtering is applied to the equalized output using values included in the updated parameter set (i.e., from block 235) to yield a filtered output (block 245). This filtering may be done, for example, using a number of digital finite impulse response filters as are known in the art. In such a case, the values included in the updated parameter set are those used to govern operation of the filters. A data detection algorithm is then applied to the filtered output guided by a data set derived from a decoded output where available (e.g., the second and later iterations through the data detector circuit and the data decoder circuit) from a central memory circuit to yield a detected output (block 250). Any coefficients or targets used in the data detection process may be received as part of the updated target parameter set. In some embodiments of the present invention, data detection algorithm is a Viterbi algorithm as are known in the art. In other embodiments of the present invention, the data detection algorithm is a maximum a posteriori data detector circuit as are known in the art. The data set derived from the decoded output maybe a de-interleaved version of the decoded data set. A signal derived from the detected output (e.g., a locally interleaved version of the detected output) is stored to the central memory to await processing by a data decoder circuit (block 255).

Figure 2B:
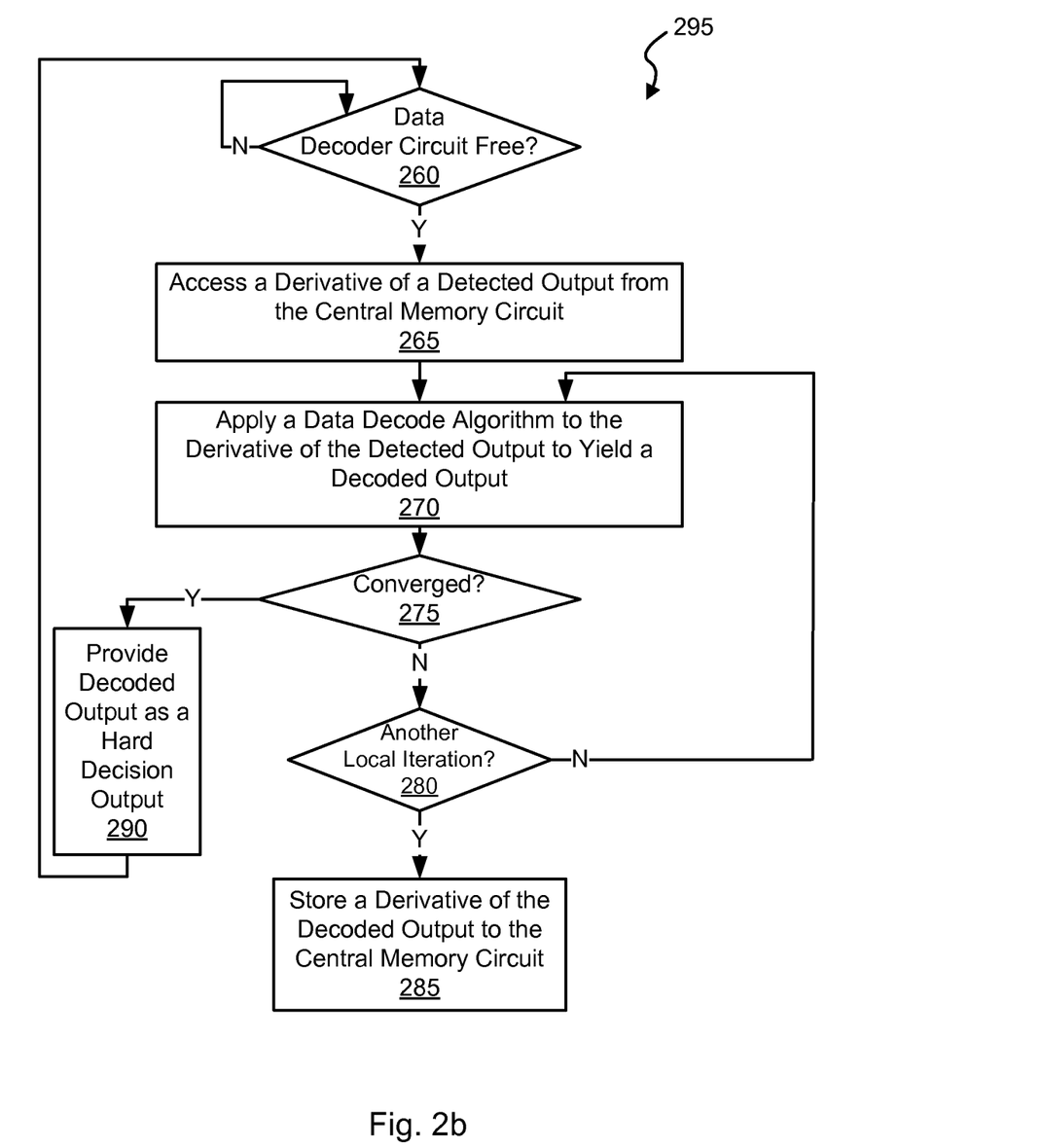

Turning to FIG. 2b, a flow diagram 295 shows a counterpart to the method of FIG. 2a including data decoding. Following flow diagram 295, it is determined whether the data decoder circuit is free (block 260). The data decoder circuit may be, for example, a low density data decoder circuit as are known in the art. Where the data decoder circuit is available (block 260), a previously stored derivative of a detected output (e.g., that stored by block 255 of FIG. 2a) is accessed from the central memory and used as a received codeword (block 265). A data decode algorithm is applied to the received codeword to yield a decoded output (block 270). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 275). Where the decoded output converged (block 275), it is provided as a hard decision output (block 290). Alternatively, where the decoded output failed to converge (block 275), it is determined whether another local iteration is desired (block 280). In some cases, four local iterations are allowed. Based upon the disclosure provided herein, one of ordinary skill in the art will recognize another number of local iterations that may be used in relation to different embodiments of the present invention. Where another local iteration is desired (block 280), the processes of blocks 260-290 are repeated for the codeword. Alternatively, where another local iteration is not desired (block 275), a derivative of the decoded output is stored to the central memory (block 285). The derivative of the decoded output being stored to the central memory triggers the data set ready query of block 405 to begin the data detection process.

Figure 3:
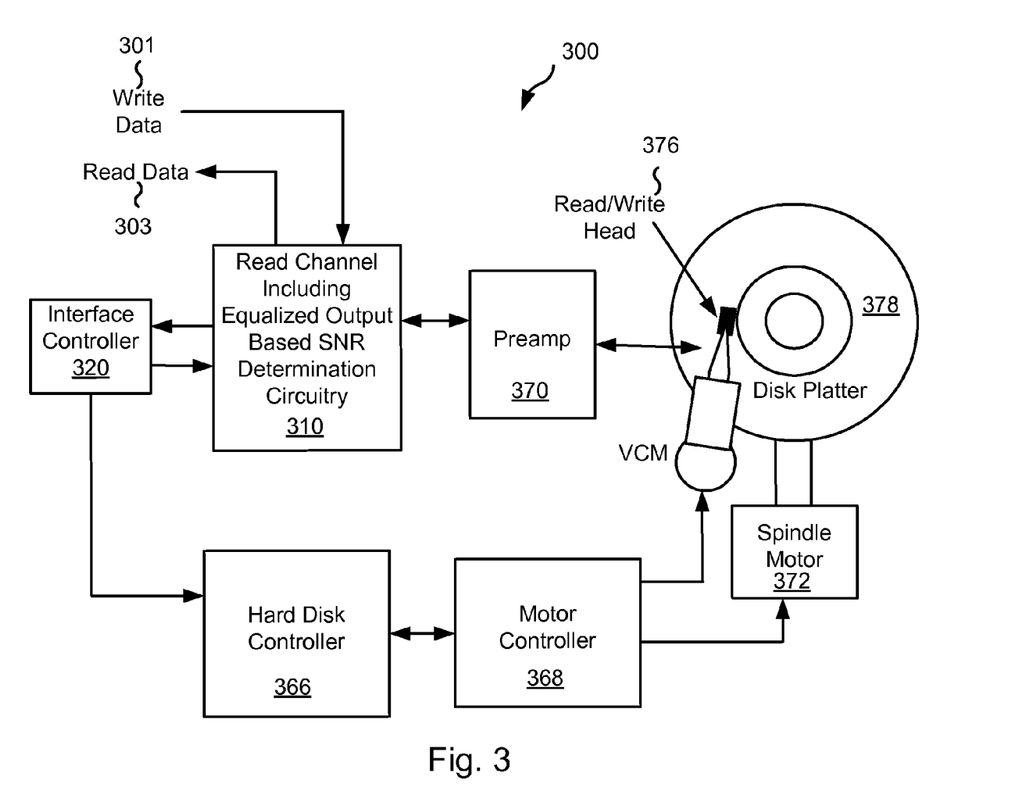
FIG. 3 shows a storage system including a read channel circuit having a signal to noise ratio determination circuit in accordance with some embodiments of the present invention.

Turning to FIG. 3, a storage system 300 including a read channel circuit 310 having a signal to noise ratio determination circuit is shown in accordance with one or more embodiments of the present invention. Storage system 300 may be, for example, a hard disk drive. Storage system 300 also includes a preamplifier 370, an interface controller 320, a hard disk controller 366, a motor controller 368, a spindle motor 372, a disk platter 378, and a read/write head assembly 376. Interface controller 320 controls addressing and timing of data to/from disk platter 378. The data on disk platter 378 consists of groups of magnetic signals that may be detected by read/write head assembly 376 when the assembly is properly positioned over disk platter 378. In one embodiment, disk platter 378 includes magnetic signals recorded in accordance with either a longitudinal or a perpendicular recording scheme.

In a typical read operation, read/write head assembly 376 is accurately positioned by motor controller 368 over a desired data track on disk platter 378. Motor controller 368 both positions read/write head assembly 376 in relation to disk platter 378 and drives spindle motor 372 by moving read/write head assembly to the proper data track on disk platter 378 under the direction of hard disk controller 366. Spindle motor 372 spins disk platter 378 at a determined spin rate (RPMs). Once read/write head assembly 378 is positioned adjacent the proper data track, magnetic signals representing data on disk platter 378 are sensed by read/write head assembly 376 as disk platter 378 is rotated by spindle motor 372. The sensed magnetic signals are provided as a continuous, minute analog signal representative of the magnetic data on disk platter 378. This minute analog signal is transferred from read/write head assembly 376 to read channel circuit 310 via preamplifier 370. Preamplifier 370 is operable to amplify the minute analog signals accessed from disk platter 378. In turn, read channel circuit 310 decodes and digitizes the received analog signal to recreate the information originally written to disk platter 378. This data is provided as read data 303 to a receiving circuit. A write operation is substantially the opposite of the preceding read operation with write data 301 being provided to read channel circuit 310. This data is then encoded and written to disk platter 378.

During operation, data accessed from disk platter 378 is processed using a data processing circuit. The data processing circuit converts received data from an analog signal to a series of corresponding digital samples, and the digital samples are equalized to yield an equalized output. The equalized output is then provided to a data processing circuit including both a data detector circuit and a data decoder circuit. As part of the processing, a signal to noise ratio may be calculated based on the equalized output and used to tune one or more parameters of the data processing circuit included as part of read channel circuit 310. In some cases, the data processing circuit may include the circuitry discussed above in relation to FIG. 1, and/or may operate consistent with the method discussed above in relation to FIG. 2.

It should be noted that storage system 300 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 300, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 4:
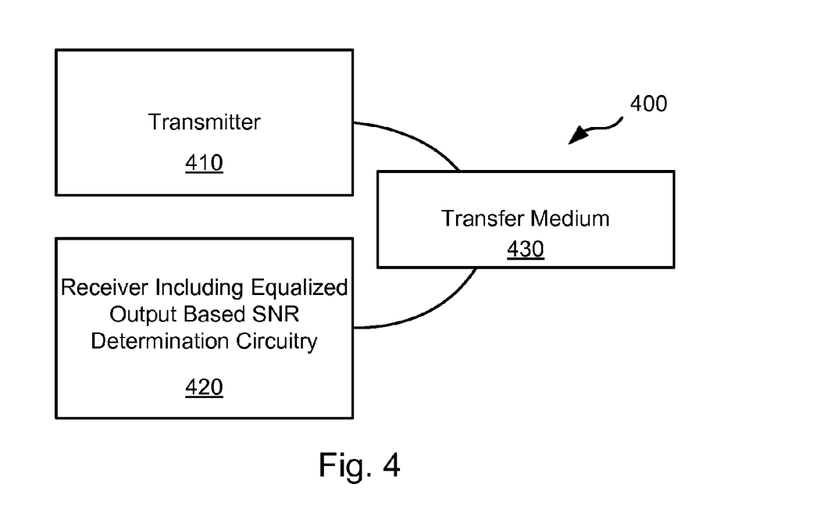
FIG. 4 depicts a communication system including a receiver having a signal to noise ratio determination circuit in accordance with various embodiments of the present invention.

Turning to FIG. 4, a communication system 400 including a receiver 420 having a signal to noise ratio determination circuit is shown in accordance with some embodiments of the present invention. Communication system 400 includes a transmitter 410 that is operable to transmit encoded information via a transfer medium 430 as is known in the art. The encoded data is received from transfer medium 430 by receiver 420. While processing received data, receiver 420 converts received data from an analog signal to a series of corresponding digital samples, and the digital samples are equalized to yield an equalized output. The equalized output is then provided to a data processing circuit including both a data detector circuit and a data decoder circuit. As part of the processing, a signal to noise ratio may be calculated based on the equalized output and used to tune one or more parameters of the data processing circuit included as part of receiver 420. In some cases, the data processing circuit may include the circuitry discussed above in relation to FIG. 1, and/or may operate consistent with the method discussed above in relation to FIG. 2. It should be noted that transfer medium 430 may be any transfer medium known in the art including, but not limited to, a wireless medium, an optical medium, or a wired medium. Based upon the disclosure provided herein, one of ordinary skill in the art will recognize a variety of transfer mediums that may be used in relation to different embodiments of the present invention.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    an equalizer circuit operable to equalize a data input to yield an equalized output;
    a signal to noise ratio calculation circuit operable to calculate a signal to noise ratio of the equalized output based at least in part on a noise power derived from the equalized output;
    a parameter adjustment circuit operable to adjust a parameter based at least in part on the signal to noise ratio; and
    a noise predictive filter circuit including a parameter input coupled to the parameter adjustment circuit and operable to receive the parameter, and a signal input coupled to the equalizer circuit and operable to receive the equalized output, and wherein the noise predictive filter circuit is operable to filter the equalized output to yield a filtered output, wherein operation of the noise predictive filter circuit is governed at least in part by the parameter.

2. The data processing system of claim 1, wherein the parameter is a first parameter, wherein the parameter adjustment circuit is further operable to adjust a second parameter based at least in part on the signal to noise ratio, and wherein the data processing system further comprises:
    a data detection circuit operable to apply a data detection algorithm to the filtered output, wherein operation of the data detection circuit is governed at least in part by the second parameter.

3. The data processing system of claim 1, wherein the data processing system further comprises:
    a data detection circuit operable to apply a data detection algorithm to a signal derived from the equalized output to yield a detected output, wherein operation of the noise predictive filter circuit is governed at least in part by the parameter.

4. The data processing system of claim 3, wherein the data detection algorithm is selected from a group consisting of: a Viterbi data detection algorithm, and a maximum a posteriori data detection algorithm.

5. The data processing system of claim 1, wherein the system is implemented as part of a device selected from a group consisting of: a storage device and a receiving device.

6. The data processing system of claim 1, wherein the data processing system is implemented as part of an integrated circuit.

7. The data processing system of claim 1, wherein the signal to noise ratio calculation circuit operable to calculate a series of error values as a difference between corresponding instances of an ideal output and the equalized output, and wherein the noise power is a sum of the square of each of the series of error values.

8. The data processing circuit of claim 7, wherein the ideal output is calculated from a known data input by summing a series of products of target values and instances of the known data input.

9. The data processing circuit of claim 7, wherein the data processing system further comprises:
    a data detection circuit operable to apply a data detection algorithm to a signal derived from the equalized output to yield a detected output, wherein operation of the noise predictive filter circuit is governed at least in part by the parameter; and
    wherein the ideal output is calculated from the detected output by summing a series of products of target values and instances of the detected output.

10. The data processing circuit of claim 7, wherein a signal power is calculated based upon a signal output selected from a group consisting of: the equalized output, and the ideal output.

11. The data processing circuit of claim 10, wherein the signal power is calculated by summing a square of each of a series of instances of the signal output.

12. The data processing circuit of claim 11, wherein the signal to noise ratio is calculated as a ratio of the signal power to the noise power.

13. A method for data processing, the method comprising:
    equalizing a data input to yield an equalized output;
    calculating a signal to noise ratio of the equalized output based at least in part on a noise power derived from the equalized output; and
    adjusting a parameter of a data processing system based at least in part on the signal to noise ratio; and
    providing a noise predictive filter circuit including a parameter input coupled to the parameter adjustment circuit and operable to receive the parameter, and a signal input coupled to the equalizer circuit and operable to receive the equalized output, and wherein the noise predictive filter circuit is operable to filter the equalized output to yield a filtered output, wherein operation of the noise predictive filter circuit is governed at least in part by the parameter.

14. The method of claim 13, wherein the parameter is a first parameter, wherein the data processing system further comprises:
    a data detection circuit operable to apply a data detection algorithm to the filtered output, wherein operation of the data detection circuit is governed at least in part by the second parameter; and
    wherein the method further comprises:
        adjusting the parameter of the data processing system based at least in part on the signal to noise ratio.

15. The method of claim 13, wherein calculating the signal to noise ratio of the equalized output based at least in part on a noise power derived from the equalized output comprises:
    calculating a series of error values as a difference between corresponding instances of an ideal output and the equalized output, wherein the noise power is a sum of the square of each of the series of error values;

calculating a signal power based upon a signal output selected from a group consisting of: the equalized output, and the ideal output; wherein the signal power is calculated by summing a square of each of a series of instances of the signal output; and calculating a ratio of the signal power to the noise power to yield the signal to noise ratio.

16. The method of claim 15, wherein the method further comprises:

applying a data detection algorithm to an equalized data set derived from the equalized output to yield a detected output, and wherein the ideal output is calculated based upon a source data set selected from a group consisting of:

a known data set; and the detected output.

17. The method of claim 16, wherein the ideal output is calculated by summing a series of products of target values and instances of the source data set.

18. A storage device, the storage device comprising:

a storage medium;

a head assembly disposed in relation to the storage medium and operable to provide a sensed signal corresponding to information on the storage medium;

a read channel circuit including:

an analog to digital converter circuit operable to sample an analog signal derived from the sensed signal to yield a series of digital samples;

an equalizer circuit operable to equalize the series of digital samples to yield an equalized output;

a signal to noise ratio calculation circuit operable to calculate a signal to noise ratio of the equalized output based at least in part on a noise power derived from the equalized output;

a parameter adjustment circuit operable to adjust a parameter based at least in part on the signal to noise ratio; and a noise predictive filter circuit including a parameter input coupled to the parameter adjustment circuit and operable to receive the parameter, and a signal input coupled to the equalizer circuit and operable to receive the equalized output, and wherein the noise predictive filter circuit is operable to filter the equalized output to yield a filtered output, wherein operation of the noise predictive filter circuit is governed at least in part by the parameter.

19. The storage device of claim 18, wherein the parameter is a first parameter, wherein the parameter adjustment circuit is further operable to adjust a second parameter based at least in part on the signal to noise ratio, and wherein the data processing system further comprises:

a data detection circuit operable to apply a data detection algorithm to the filtered output, wherein operation of the data detection circuit is governed at least in part by the second parameter.

20. The storage device of claim 18, wherein the signal to noise ratio calculation circuit operable to calculate a series of error values as a difference between corresponding instances of an ideal output and the equalized output, and wherein the noise power is a sum of the square of each of the series of error values; wherein a signal power is calculated based upon a signal output selected from a group consisting of: the equalized output, and the ideal output; wherein the signal power is calculated by summing a square of each of a series of instances of the signal output; and wherein the signal to noise ratio is calculated as a ratio of the signal power to the noise power.

* * * * *